United States Patent [19]

Abboud et al.

[11] Patent Number: 5,179,903

[45] Date of Patent: Jan. 19, 1993

[54] CLOSED LOOP INCINERATION PROCESS

[76] Inventors: Harry I. Abboud, 5845 Clematis Dr., Baton Rouge, La. 70808; Chip Efferson, Rte. 2, Box 2445, Ethel, La. 70730

[21] Appl. No.: 719,799

[22] Filed: Jun. 24, 1991

[51] Int. Cl.⁵ .............................................. F23J 11/00
[52] U.S. Cl. ..................................... 110/345; 110/204; 110/216
[58] Field of Search ............... 110/204, 211, 215, 216, 110/345

[56]  References Cited

U.S. PATENT DOCUMENTS

| | | | |
|---|---|---|---|
| 4,320,709 | 3/1982 | Hladun | 110/215 X |
| 4,620,492 | 11/1986 | Vogg et al. | 110/215 X |
| 4,762,074 | 8/1988 | Swensen | 110/215 X |
| 4,788,918 | 12/1988 | Keller | 110/215 |
| 4,958,578 | 9/1990 | Houser | 110/216 X |
| 5,035,188 | 7/1991 | Johnzen et al. | 110/215 X |

Primary Examiner—John C. Fox
Attorney, Agent, or Firm—Llewellyn A. Proctor

[57] ABSTRACT

An incineration process which can utilize any type of incineration means for disposing of hazardous, as well as non-hazardous, burnable waste. Such waste include toxic combustible liquids, oil slurries, soils contaminated with dioxin, PCBs, creosote, or any other potentially toxic combustible material. In particular, the present invention relates to an incineration process which has no continuous stack discharge or pollution. In this process, a portion of the flue gas stream is enriched with oxygen and recycled to the incineration means. The remaining portion of the flue gas stream is scrubbed to remove acid gases and passed through a purification zone wherein any remaining contaminates are removed.

16 Claims, 1 Drawing Sheet

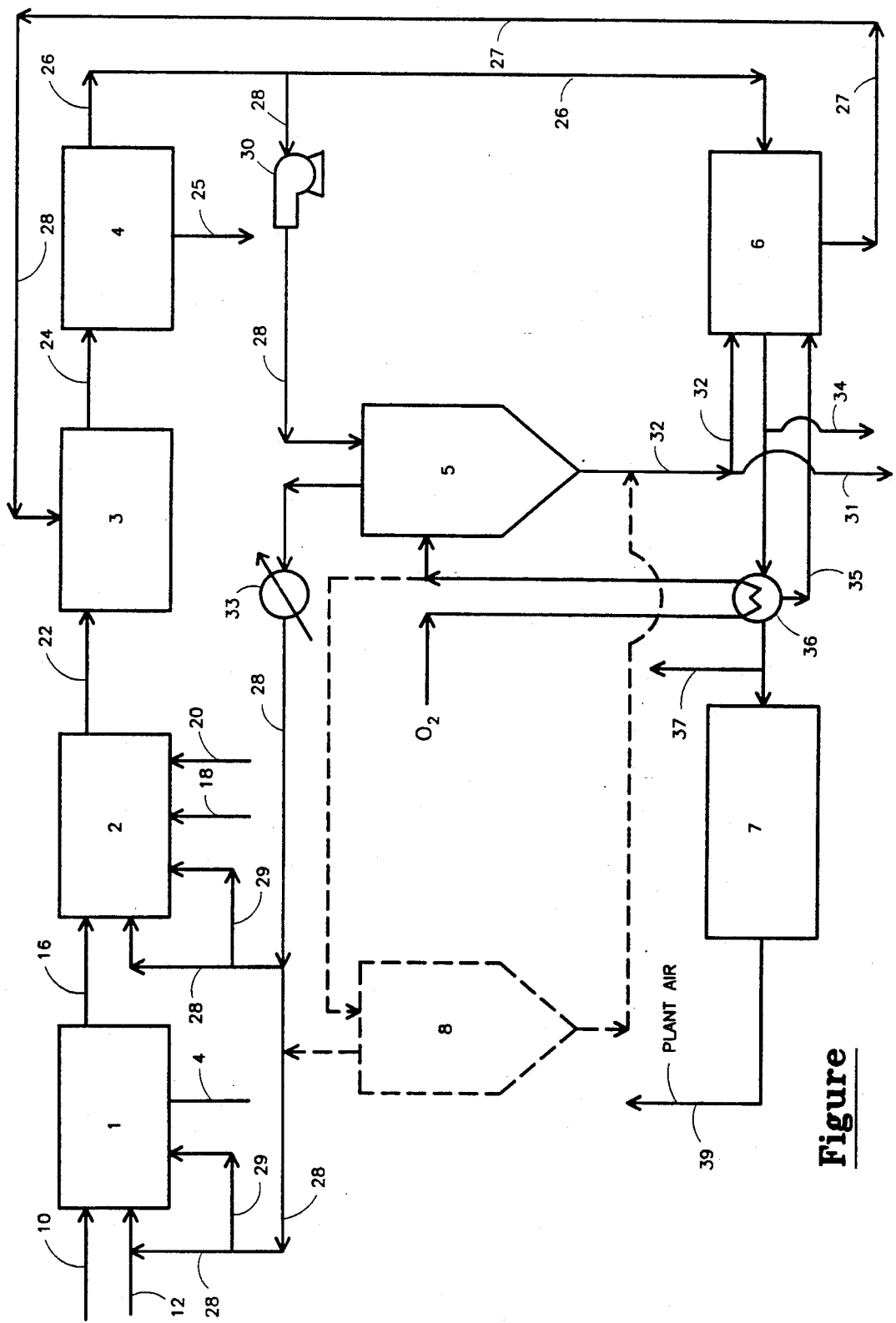
Figure

CLOSED LOOP INCINERATION PROCESS

FIELD OF THE INVENTION

This invention relates to a closed loop incineration process which can utilize any type of incineration means for disposing of hazardous, as well as non-hazardous, burnable waste. Such waste include toxic combustible liquids, oil slurries, soils contaminated with dioxin, PCBs, creosote, or any other potentially harmful or toxic combustible material. In particular, the present invention relates to an incineration process which has no continuous stack discharge of pollutants. In this process, a portion of the flue gas stream is enriched with oxygen and recycled to the incineration means. The remaining portion of the flue gas stream is scrubbed to remove acid gases and, if necessary, passed through a purification zone wherein any remaining contaminates ar removed.

BACKGROUND OF THE INVENTION

The disposal of hazardous waste is increasingly becoming a serious problem to industry as governmental regulations become tighter and tighter. Two leading technologies for disposing of hazardous waste are landfills and incineration. While the industry has historically preferred landfills over incineration, primarily because of cost, incineration is becoming more attractive. One reason for this is because governmental regulations regarding landfills are getting tougher. For example, in 1989 a new extended list of chemical streams banned from landfills went into effect. As industry turns toward incineration as the primary means of disposing of hazardous waste, they are also being faced with tougher and tougher incineration restrictions. For example, the destruction and removal efficiency (DRE) ratings for incineration are presently set at 99.99% for most hazardous waste, and 99.9999% for polychlorinated biphenyls (PCBs).

This has created a substantial problem for industry. For example, in the petrochemical and oil producing states, the problem of cleaning up contaminated sites and waste-oil pits are already of paramount importance, and is becoming even more acute. The quantity of waste oil contamination at oil field drilling sites has become a problem of great magnitude. The necessity of hauling the accumulated contaminated material from wide spread areas of contamination to a central decontamination site aggravates the problem considerably. Likewise, the problem of cleaning up abandoned petrochemical sites is even more severe.

The problem is particularly intense in the burning of hazardous waste. This is because not only must the waste be rapidly disposed of before harm is done to the environment, but additionally, the destruction of any potentially toxic chemicals must be sufficiently complete so that the gases which evolve therefrom are non-hazardous. To completely decompose such chemicals, relatively highly efficient and high temperature combustion is needed to lower the cost of incineration, which is typically expensive.

The discharge stack emissions from incineration are typically an important concern for several reasons. One reason is that the public views stack emission plumes with suspicion, and sometimes justifiable fears, that the incinerator operator is discharging hazardous, or toxic, gases into the atmosphere. Another reason is that federal and state authorities have regulations governing stack emissions with regular monitoring, testing, and validation to insure that prescribed emission limits are not being exceeded.

Therefore, there is a substantial need in the art for improved incineration processes which are able to meet the present destruction and removal efficiency requirements, as well as requirements in the foreseen future.

OBJECTIVES

An object of the present invention is to provide an improved incineration process which does not have the conventional discharge stack emissions with the potential for emitting pollutants into the atmosphere.

A specific object of the present invention is to provide an improved incineration process in which all of the flue gases from the incinerator are compressed and a portion is recycled to the combustion zone and another portion is purified and can be used as a substitute for plant air. That is, it can be used for such things as: a carrier, or diluent, to the incineration, or combustion, means; an inert gas for the blanketing of tanks of combustibles; an atomizing gas for any hazardous liquid or liquid fuel burned in the incineration means; an atomizing gas for the water sprays in the scrubbing/cooling zones; process plant air; instrument air; and/or for the manufacture of chemicals, such as fertilizers.

A further object of the present invention is to provide a flue gas purification system in which any trace components of potentially harmful chemical vapors are removed from the flue gases.

SUMMARY OF THE INVENTION

In accordance with the present invention, there is provided an improved process for combusting waste materials so that substantially no contaminants are released into the environment. The process comprises:

(a) feeding combustible waste material into a first combustion zone where they are combusted at a temperature from about 1400° F. to about 2200° F.;

(b) passing the resulting flue gases from said first combustion zone to a second combustion zone where they are further combusted at a temperature from 1800° F. to about 2500° F.;

(c) passing the resulting flue gases from said second combustion zone to a cooling zone where it is contacted with an aqueous solution or slurry of acid and/or alkaline salts from a downstream scrubbing zone and cooled by at least 1000° F. with the formation of dry acid salts;

(d) passing the flue gases/salts mixture from said cooling zone to a gas/solids separation zone, where the solid salt material is separated and collected from said flue gases;

(e) recycling a portion of the flue gases, and added oxygen, to said first combustion zone and/or second combustion zone; and (f) passing the remaining portion of said flue gases to a wet gas scrubbing zone, containing an aqueous alkaline solutionry or slurry, wherein acid gases are removed.

In a preferred embodiment of the present invention, the combustible waste material is a hazardous material and the flue gases from the wet scrubbing zone are passed to a purification zone containing a purifier substance selected from the group consisting of an aqueous alkaline solution or slurry, and activated carbon, wherein any remaining acid gases, and any other contaminants, such as hydrocarbon gas and sulfur compounds, are removed.

In another preferred embodiment of the present invention, the flue gases from the first combustion zone are passed to a gas/solids separation zone, preferably a cyclone separator, before entering the second combustion zone.

In yet another preferred embodiment of the present invention, the flue gases which are recycled from step (e) are compressed and oxygen added to bring the oxygen content up to at least 20 vol. %. Any liquid fraction is passed to the wet gas scrubbing zone.

BRIEF DESCRIPTION OF THE FIGURE

The sole FIGURE hereof is a simplified flow diagram of a preferred embodiment of the incineration process of the present invention.

DETAILED DESCRIPTION OF THE INVENTION

Any combustible hazardous and non-hazardous material may be incinerated by the practice of the present invention. Non-limiting examples of such materials include toxic combustible liquids, oil slurries, soils contaminated with dioxin, creosote, PCBs, and any other potentially toxic combustible material, preferably those which are potentially hazardous.

The present invention can be best understood by reference to the sole figure hereof. Combustible waste material is fed via 10 into first combustion zone 1. The combustion zone is maintained at a temperature from about 1400° F. to about 2200° F., preferably from about 1700° F. to about 2100° F., more preferably about 1900° F. to about 2100° F. A suitable fuel is also fed to the first combustion zone via line 12. Any suitable fuel can be used which is capable of maintaining said combustion temperatures. Non-limiting examples of such suitable fuels include natural gas, fuel oil, hazardous waste(preferably liquid), and coal. Ash is removed from first combustion zone 1 via line 14. Flue gases from this first combustion zone are passed via line 16 to second combustion zone 2. It is understood that the flue gases from the first combustion zone may be passed through a cyclone separator prior to entering the second combustion zone. The cyclone separator may be any conventional cyclone separator used to separate particulate matter at the temperatures of the flue gases. The cyclone separator can be a single cyclone or a multicyclone system. Combustion temperatures of this second combustion zone are maintained at a temperature from about 1800° F. to about 2500° F., preferably from about 1900° F. to about 2300° F., and more preferably at temperatures in excess of 2000° F. It is also preferred that the second combustion zone be operated at a temperature in excess of 100° F., preferably 200° F., and more preferably 300° F. than that of said first combustion zone.

Additional combustible waste material may be introduced into said second combustion zone via line 18, with fuel and/or hazardous waste, being introduced via line 20. The flue gases from said second combustion zone 2 are passed via line 22 to cooling zone 3 and are cooled by at least 1000° F., preferably to a temperature of about 400° F. to 600° F., more preferably to about 450° F. to 550° F. This cooling zone also acts as a drying zone wherein an aqueous solution or slurry of acid and/or alkaline salts from the downstream wet gas scrubbing zone is atomized, or spray dried, into said cooling zone.

The flue gases from cooling zone 3 are passed via line 24 to solids separation zone 4 wherein particulate material is separated from said flue gases and collected via line 25. This separation zone can be a so-called "bag-house" wherein particulate material is separated from the flue gases and collected in drums for disposal. It can also be a series of solids cyclone separators. The remaining flue gases are passed from separation zone 4 via line 26 and split into two portions. One portion is enriched with oxygen and routed via line 28, for recycling to the first and/or second combustion zones and the other portion is sent to further purification which includes first sending it to a wet gas scrubbing zone 6. The flue gases which are recycled to the combustion zones can be further split at the combustion zones to provide a primary oxygen enriched stream and a secondary oxygen enriched stream 29. The secondary oxygen enriched stream will of course be fed downstream in the combustion zone(s) from the primary oxygen enriched stream.

If the solids separation zone 4 was comprised of a series of cyclones instead of a bag-house, then the portion of flue gases being passed to the wet gas scrubbing zone 6 can be passed to a bag-house prior to entering the wet gas scrubbing zone. The portions of the flue gases which are split will depend on such things as water balance in the system. The precise split is within the skill of those in the art and will not be further elaborated on herein. Generally, the portion of the flue gases directed to the wet gas scrubbing zone versus the portion recycled to the combustion zones is about 1 to 1, preferably about 1 to 2, and more preferably about 1 to 3.

It is preferred that before a portion of the flue gases is recycled it first passed through a blower, or compressor 30 to provide enough compressing action to keep the pressure of the stream within an acceptable range. That is, to provide enough pressure for it to return to the combustion zones and to keep the water in vapor form. It is also preferred that it pass through a zone wherein oxygen is added. Such a zone will preferably be a synthetic air generation zone 5 wherein oxygen is added to provide an oxygen level of 20 vol. %, preferably at least 25 vol. %. Higher levels of oxygen, for example up to about 40 vol. %, or more, may also be beneficial for improved burning of certain toxic wastes. While a synthetic air generation means is preferred, it is understood that any suitable means for incorporating oxygen into the flue gas stream can be used. The synthetic air generator may also be of a cyclone design to facilitate mixing and condensate removal. Any liquid fraction separated in the synthetic air generation zone 5 can be passed via line 32 to wet gas scrubbing zone 6. The liquid fraction can also be discarded via line 31. A heat exchanger 33 may also be provided in line 28 after the synthetic air generation zone 5 in order to help insure that any water in the stream is maintained as steam, or vapor, and not as liquid water. This will help prevent corrosion.

It may be desirable to increase the oxygen content of the first combustion zone past the 40 vol. % level. For example from about 40 vol. % to 80 vol. %, preferably from about 60 vol. % to 80 vol. %, when combusting waste having a relatively low heating value, such as contaminated soil. In such a case, a source of oxygen can be provided for the first combustion zone, preferably introduced into the recycle flue gas stream feeding into the combustion zone. The preferred source of oxygen will be a synthetic air generator as previously discussed for adding oxygen into line 28, and which is shown by dashed lines as an optional piece of equipment 8.

The other portion of the flue gases from separation zone 4 is passed to a wet gas scrubbing zone 6 wherein acid gases, and any remaining particulate material, are removed. The wet gas scrubbing zone will typically contain an aqueous alkaline material, such as sodium hydroxide, sodium carbonate, calcium hydroxide, potassium carbonate, and the like. Precipitated acid salts from the wet gas scrubbing zone are sent to the cooling zone 3 via line 27, preferably as an aqueous solution or slurry, and fresh alkaline material is introduced to maintain a steady state. At least a portion of the alkaline material may come from another scrubbing zone, which is downstream of scrubbing zone 6. The scrubbed flue gases can then either be released into the atmosphere if clean via discharge stack 37, or they can be sent for further purification. If sent for further purification, they are first compressed by a compressor (not shown) and cooled via cooler 36, preferably by the use of an oxygen feed to the synthetic air generator(s). Any liquid fraction, usually water, remaining after the compressor following the wet gas scrubbing zone can be discarded, collected, or recycled to the wet gas scrubbing zone via line 34. Any water obtained during the cooling step can be collected or a portion collected and another portion recycled to the wet gas scrubbing zone via line 35.

If contaminants or pollutants are still present, the flue gas stream from the wet gas scrubbing zone is passed to a purification zone 7. Depending on the nature of the pollutants which remain in the flue gases, the purification zone 7 may contain one or more stages. It is preferred for the types of flue gases and pollutants encountered in the incineration of hazardous waste material that the following stages be provided: (a) a stage for removing CO and other light gases, such as hydrocarbon gases, which stage is represented by a vessel comprised of an absorbent material, such as an aqueous cuprous chloride solution, or an organic solvent, preferably a $C_1$ to $C_4$ alcohol, preferably ethanol; (b) a stage for removing acid gases and halides such as $Cl_2$, $F_2$, etc., and any remaining particulate material, which zone is preferably operated by passing the flue gases through an aqueous alkaline solution or slurry; and (c) a stage for removing any residual hydrocarbon gases and sulfur impurities, which zone can be represented by a bed of activated carbon. If necessary, an additional zone may be employed which can be comprised of an organic solvent treatment for removing any residual CO and organic gases. The organic solvent may also be a fuel source for the combustion zones, which fuel is sent to the combustion zones after absorbing the desired level of contaminants. While it is preferred that the sequence of stages be as set forth above, it is to be understood that any appropriate sequence may be used.

The above described stages can be regenerated by any appropriate means, which means are well known in the art. For example, if a stage is used employing an aqueous cuprous chloride solution, it can be regenerated by heating the spent cuprous chloride to release CO. The released CO can be sent to the combustion zones. The alkaline scrubbing zone can be comprised of any appropriate solution or slurry for scrubbing acid gases. Non-limiting examples of suitable solutions or slurries include aqueous alkaline materials as well as alkanolamines, such as monoethanolamine. Preferred aqueous alkaline solutions include sodium hydroxide solutions, sodium carbonate solutions, calcium hydroxide solutions and slurries, and potassium carbonate solutions. Preferred are sodium hydroxide solutions and calcium hydroxide solutions and slurries. Of course, such an alkaline stage is typically operated by removing precipitated salts and maintaining steady state conditions by adding fresh alkaline scrubbing solution or slurry.

Discharge via line 39, from purification zone 7, is a purified gaseous stream which can be used as a substitute for plant air. That is, it can be used for such things as: a carrier, or diluent, to the incineration, or combustion, means; an inert gas for the blanketing of tanks of combustibles; an atomizing gas for any hazardous liquid or liquid fuel burned in the incineration means; an atomizing gas for the water sprays in the scrubbing/cooling zones; process plant air; instrument air; and/or for the manufacture of chemicals, such as fertilizers.

What is claimed is:

1. A process for combusting hazardous waste materials so that substantially all of the contaminants are removed from the resulting flue gas comprising:
   (a) feeding combustible waste material into a first combustion zone where they are combusted at a temperature from about 1400° F. to about 2200° F.;
   (b) passing the resulting flue gas stream from said first combustion zone to a second combustion zone where they are further combusted at a temperature from about 1800° F. to about 2500° F.;
   (c) passing the resulting flue gas stream from said second combustion zone to a cooling zone containing an aqueous solution or slurry containing acid salts or alkaline salts, or both, from a downstream wet gas scrubbing zone, wherein the flue gas stream is cooled by at least 1000° F. with the formation of acid salts;
   (d) passing the flue gas/solids mixture from said cooling zone to a separation zone, where the solid material is separated and collected from said flue gas;
   (e) recycling a portion of the flue gas stream, to which oxygen is added to bring the oxygen content of said flue gas stream to at least about 20 volume, to said first combustion zone and/or second combustion zone; and
   (f) passing the remaining portion of said flue gas to a wet scrubbing zone, containing an aqueous alkaline solution or slurry, wherein acid gases and residual particulates are removed.

2. The process of claim 1 wherein the combustible waste material is a hazardous material.

3. The process of claim 2 wherein the temperature of the first combustion zone is from about 1900° F. to about 2100° F.

4. The process of claim 3 wherein the temperature of the second combustion zone is from about 2000° F. to about 2300° F., with the proviso that it be at least 100° F. higher than that of the first combustion zone.

5. The process of claim 2 wherein the flue gases from the first combustion zone are passed through a cyclone separator before entering the second combustion zone.

6. The process of claim 5 wherein the recycle flue gas stream going to the first combustion zone is enriched with oxygen to provide from about 40 vol. % to about 80 vol. % oxygen.

7. The process of claim 6 wherein the recycle flue gas stream going to the first combustion zone is enriched with oxygen to provide from about 60 vol. % to about 80 vol. % oxygen.

8. The process of claim 1 wherein the flue gases from the wet scrubbing zone of step (f) are passed to a purification zone containing one or more of the following stages: (i) a stage for removing CO and other light gases; (ii) a stage for removing CO and hydrocarbon gases; (iii) a stage for removing acid gases, halides, and any remaining particulate matter; and (iv) a stage for removing oxides such as $SO_x$ and $NO_x$.

9. The process of claim 8 wherein the stage for removing CO and hydrocarbon gases is comprised of: (i) an organic solvent, or (ii) an aqueous cuprous chloride solution.

10. The process of claim 9 wherein the organic solvent is a $C^1$ to $C^4$ alcohol.

11. The process of claim 6 wherein the stage for removing residual hydrocarbon gases and sulfur impurities is comprised of activated carbon or a molecular sieve.

12. The process of claim 8 wherein the stage for removing additional acid gases is comprised of an aqueous alkaline scrubbing solution or slurry.

13. The process of claim 1 wherein the temperature of the first combustion zone is from about 1900° F. and the temperature of the second combustion zone is from about 2000° F. to about 2300° F., with the proviso that the second combustion zone be operated at a temperature which is at least 100° F. higher than that of the first combustion zone.

14. The process of claim 13 wherein the following stages are present: (a) a stage for removing CO and is comprised of an aqueous solution of cuprous chloride; (b) a stage for removing residual acid gases and is comprised of an aqueous alkaline solution or slurry; and (c) a stage for removing hydrocarbon gases and sulfur impurities and is comprised of activated carbon.

15. The process of claim 14 wherein the flue gases recycled to the first combustion stage have an oxygen content from about 40 volume % to about 80 volume %.

16. The process of claim 15 wherein the flue gases recycled to the first combustion stage have an oxygen content from about 60 volume % to about 80 volume %.

* * * * *